United States Patent [19]
Kitora

[11] Patent Number: 5,331,586
[45] Date of Patent: Jul. 19, 1994

[54] SQUARE ROOT EXTRACTOR

[75] Inventor: Yoshitsugu Kitora, Ikeda, Japan

[73] Assignee: Ricoh Company, Ltd., Tokyo, Japan

[21] Appl. No.: 833,368

[22] Filed: Feb. 10, 1992

[30] Foreign Application Priority Data

Feb. 12, 1991 [JP] Japan ............................... 3-018727

[51] Int. Cl.$^5$ .............................................. G06F 7/38
[52] U.S. Cl. ................................................ 364/752
[58] Field of Search ........................................ 364/752

[56] References Cited

U.S. PATENT DOCUMENTS 4,748,581 5/1988 DeTroye ........................... 364/752

FOREIGN PATENT DOCUMENTS 59-2055 1/1984 Japan ........................... G06F 7/552

*Primary Examiner*—Long T. Nguyen
*Attorney, Agent, or Firm*—Cooper & Dunham

[57] ABSTRACT

An extractor of a square root has rows of first and second arithmetic elements, the number of which is determined in correspondence with bit lengths of a number to be extracted and of the square root thereof. The first arithmetic element comprises an adder for carrying out an addition operation based on either bit data out of the number to be extracted or zero, inverted input data, and carry data, to output addition result data and carry data, first selection circuit for outputting as first output data either the addition result data, or either the bit data or zero, based on selection data, and a second selection circuit for selecting either one or zero based on the selection data to output the selected data as second output data. The second arithmetic element comprises an incrementer for adding increment carry data to increment output data to output increment carry data and increment output data, an adder for carrying out an addition operation based on inverted output data of the incrementer, either bit data out of the number to be extracted, zero, or output data, and carry data, to output addition result data and carry data, and a selection circuit for selecting one out of the addition result data and either the bit data, zero, or output data based on selection data to output the selected data as output data.

17 Claims, 14 Drawing Sheets

SQUARE ROOT EXTRACTOR

BACKGROUND OF THE INVENTION

1. Field of the Invention

The present invention relates to an extractor of a square root.

2. Description of the Related Art

There is known an arithmetic method for extracting a square root of a number of binary digit, for instance, as disclosed in Japanese Patent Publication (KOKOKU) No. 59-2055. In the method as disclosed, an arithmetic operation is repeated for each bit starting from the most significant bit to the lower bit of a number to be extracted, so that a square root is obtained for each bit. After finishing an operation of the least significant bit of the number to be extracted, the square root is finally obtained. Therefore, if the number to be extracted is constructed, for example, by eight bits, the square root is obtained by repeating the similar operations eight times, which results in requiring a great time for the calculation. Furthermore, since the extractor of a square root as disclosed in the above Japanese patent Publication includes in its structure shift registers necessitating control circuits to control their operations, the circuit structure is made complex, which was another problem in the conventional method.

SUMMARY OF THE INVENTION

It is therefore an object of the present invention to provide an extractor of a square root requiring a less operation time with a simpler structure, solving the above-described problems.

The object of the invention can be achieved by an apparatus comprising an extractor of a square root comprising: a first arithmetic element comprising an adder for carrying out an addition operation based on either bit data out of a number to be extracted or zero, inverted input data, and carry data, to output addition result data and carry data, a first selection circuit for outputting as first output data either the addition result data, or either the bit data or zero, based on selection data, and a second selection circuit for selecting either one or zero based on the selection data to output the selected data as second output data; and a second arithmetic element comprising an incrementer for adding increment carry data to increment output data to output increment carry data and increment output data, an adder for carrying out an addition operation based on inverted output data of the incrementer, either bit data out of the number to be extracted, zero, or output data, and carry data, to output addition result data and carry data, and a selection circuit for selecting one out of the addition result data and either the bit data, zero, or output data based on selection data to output the selected data as output data; wherein the first and second arithmetic elements are connected in series and in a plurality of rows in correspondence with bit lengths of the number to be extracted and of the square root thereof.

As constituted above, each row consisted of the first and second arithmetic elements produces each bit data of the square root, which means that each arithmetic operation for each bit data takes an independent operation time. As a result, the total operation time becomes shortened as compared with the conventional method. Also, the first and second arithmetic elements include neither registers nor shifters, which require operation control, so that the circuit structure of the square root extractor according to the present invention may be made much simpler.

Further objects and advantages of the present invention will be apparent from the following description of the preferred embodiment of the invention as illustrated in the accompanying drawings.

Figure 1:
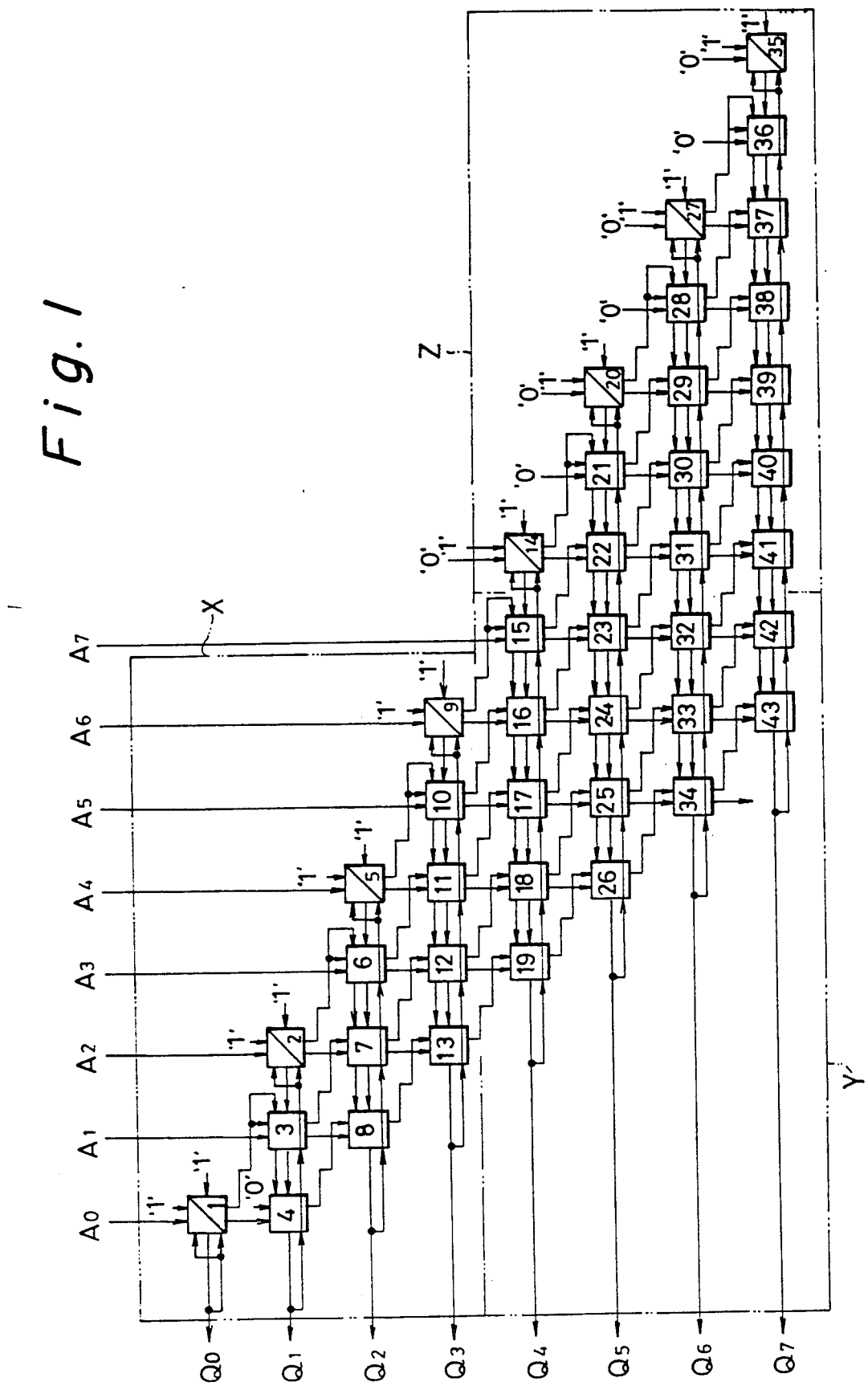
FIG. 1 is a block diagram to show a preferred embodiment of an square root extractor according to the present invention.
Figure 4:
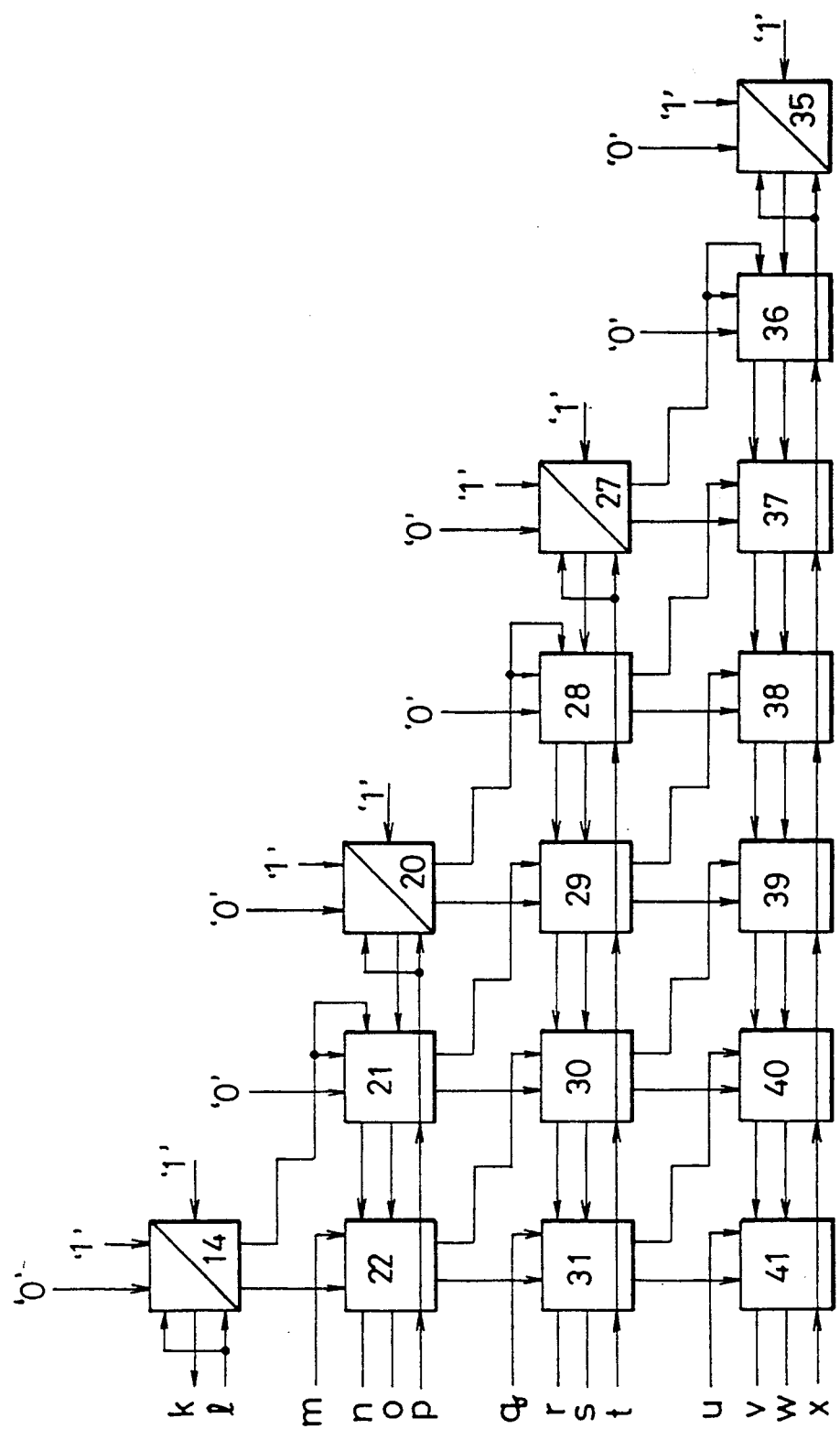
Figure 5:
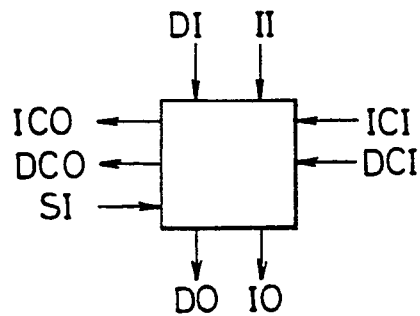
Figure 6:
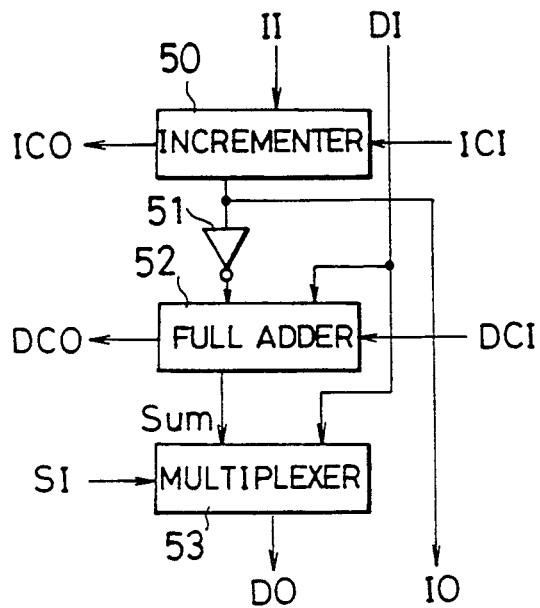
Figure 7:
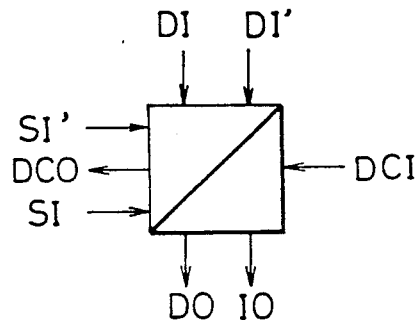
Figure 8:
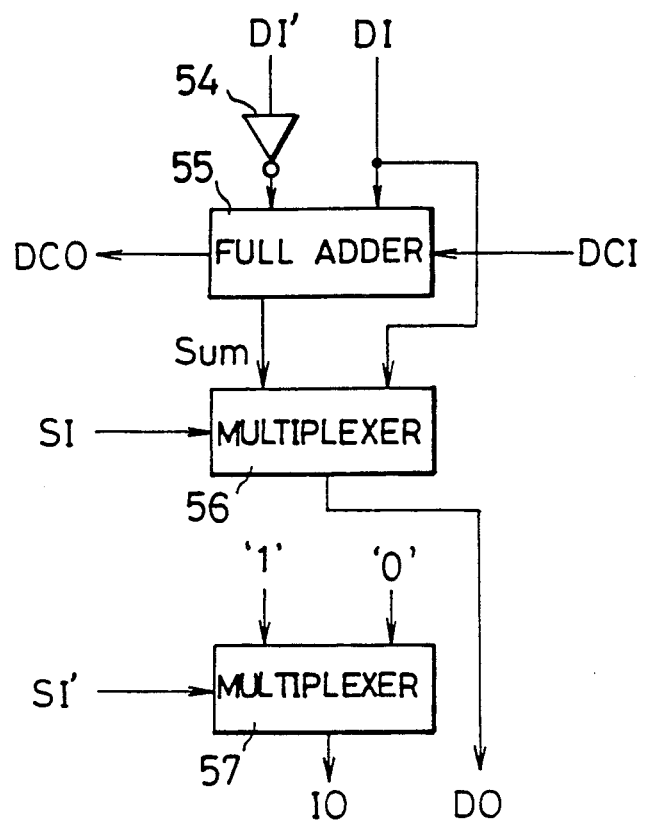
Figure 9:
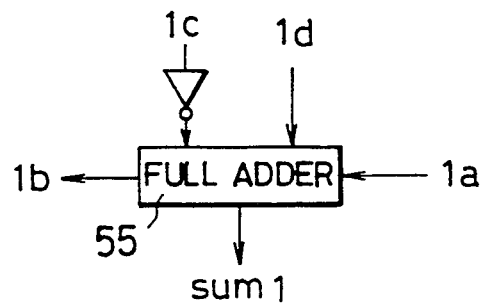
Figure 10:
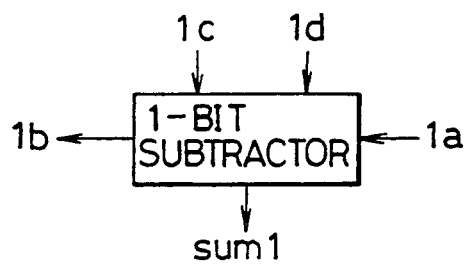
Figure 11:
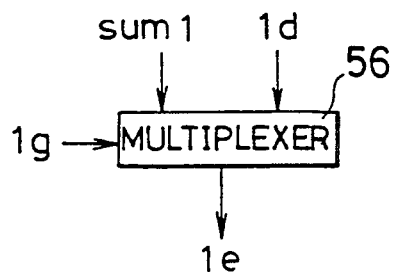
Figure 12:
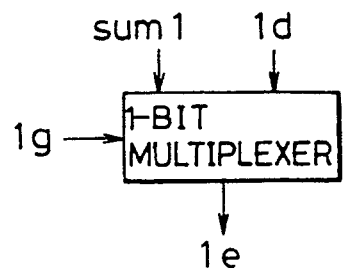
Figure 13:
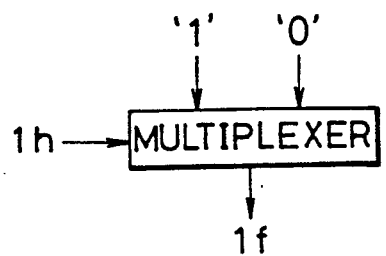
Figure 14:
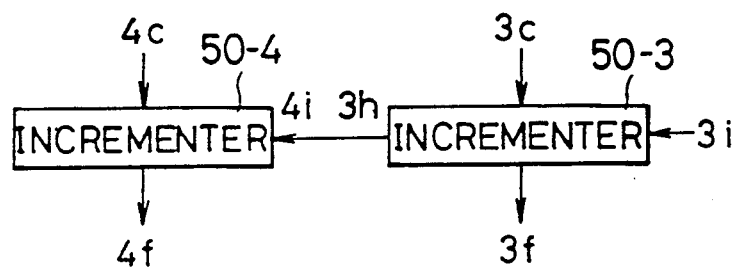
Figure 15:
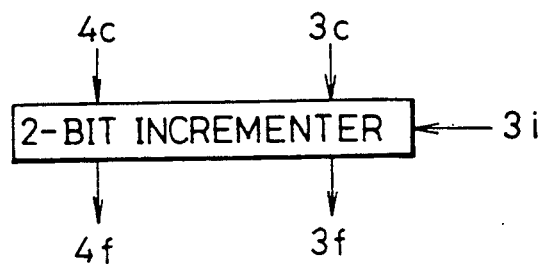
Figure 16:
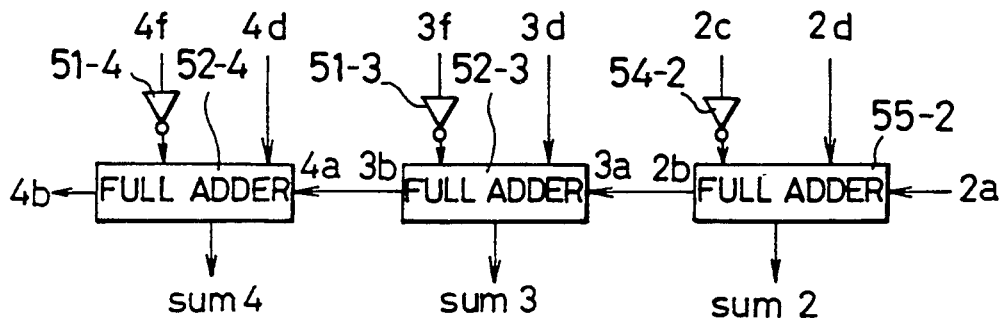
Figure 17:
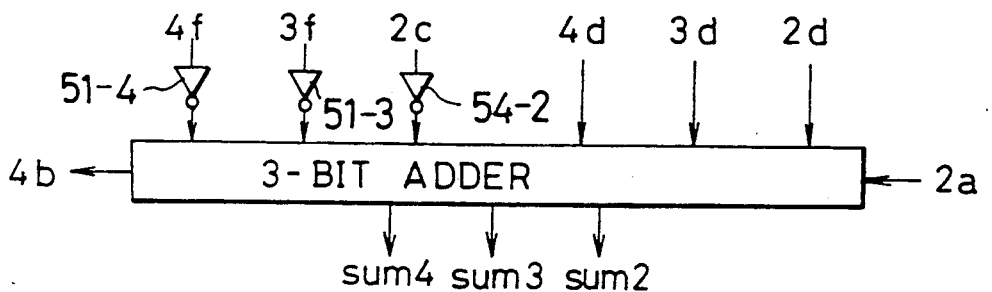
Figure 18:
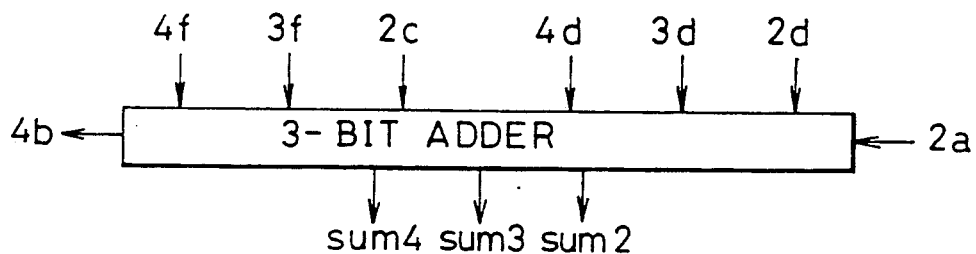
Figure 19:
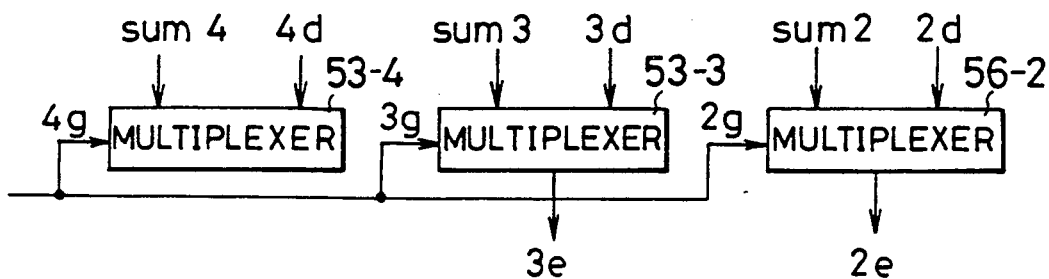
Figure 20:
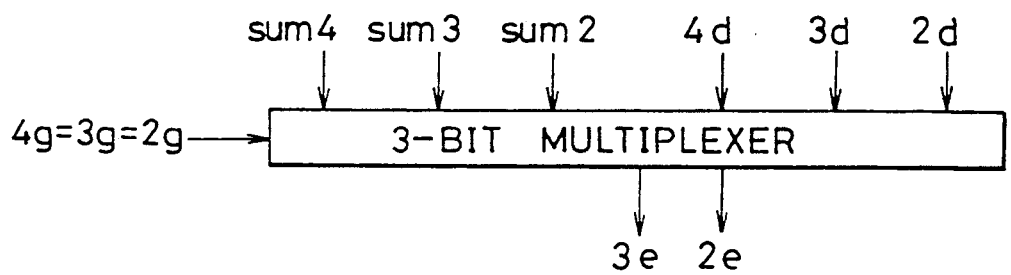
Figure 21:
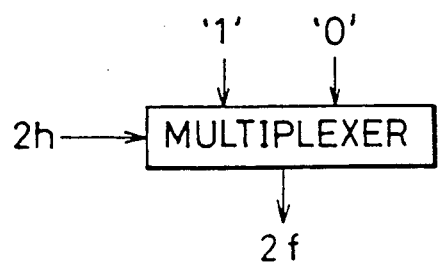
Figure 22:
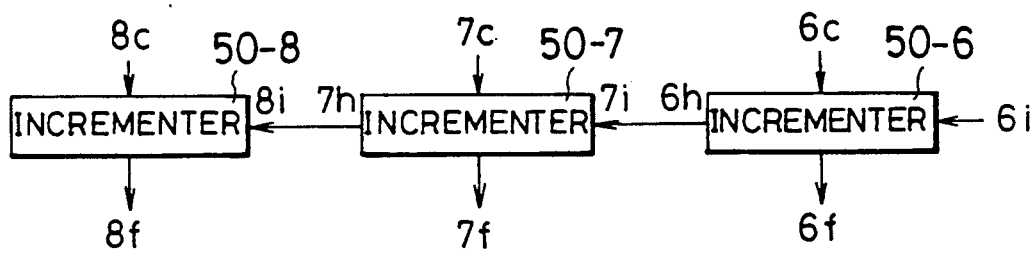
Figure 23:
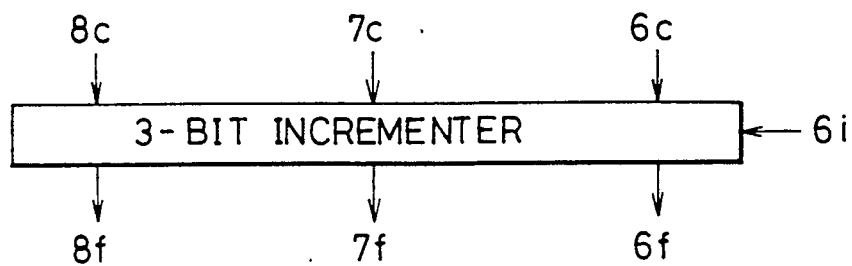
Figure 24:
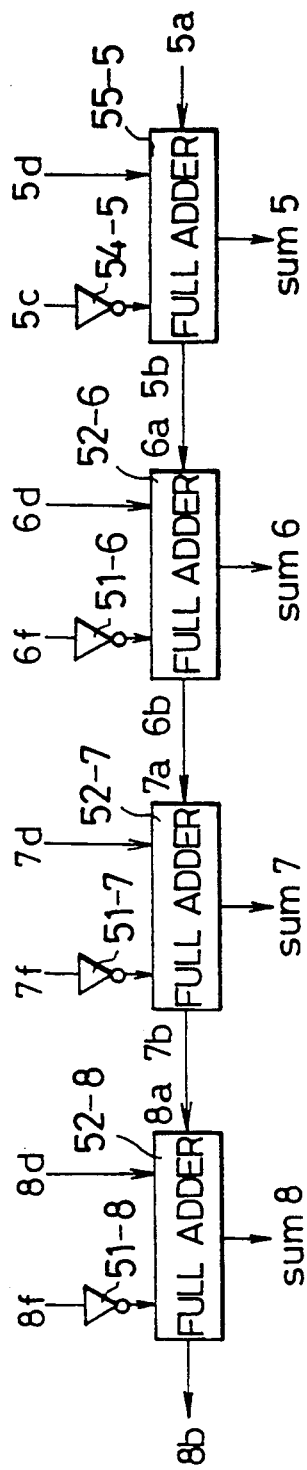
Figure 25:
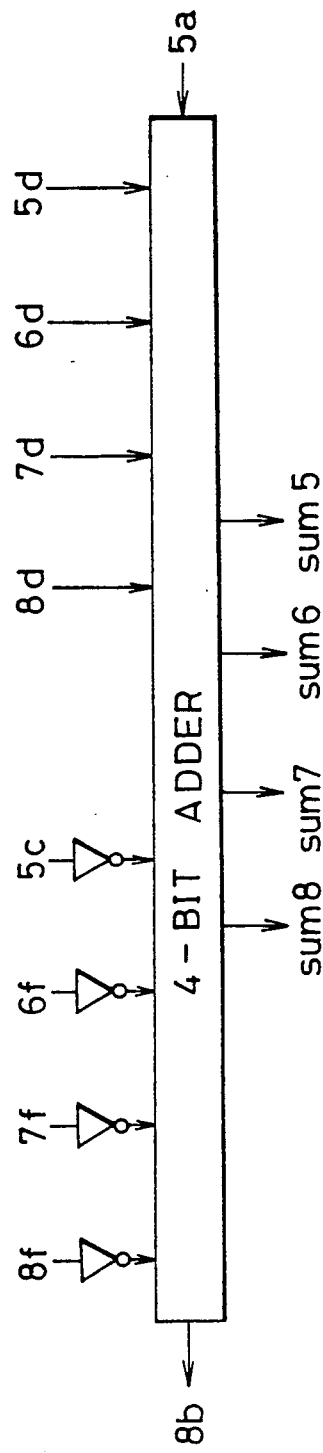
Figure 26:
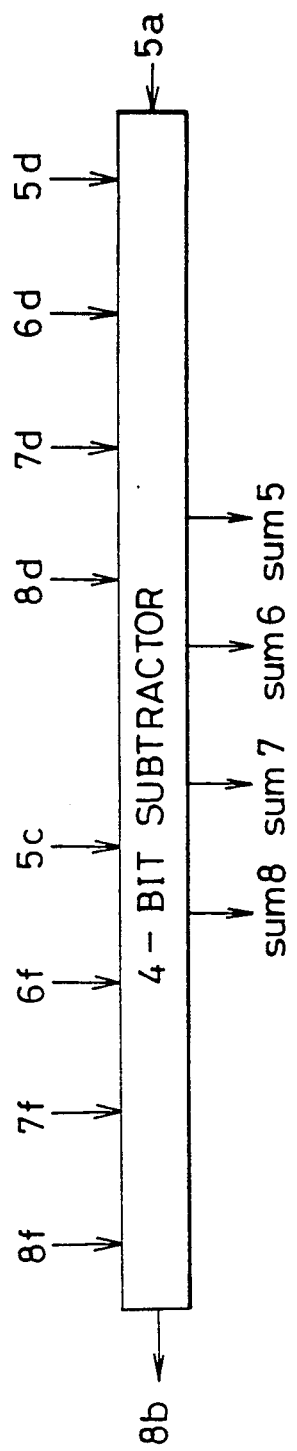
Figure 27:
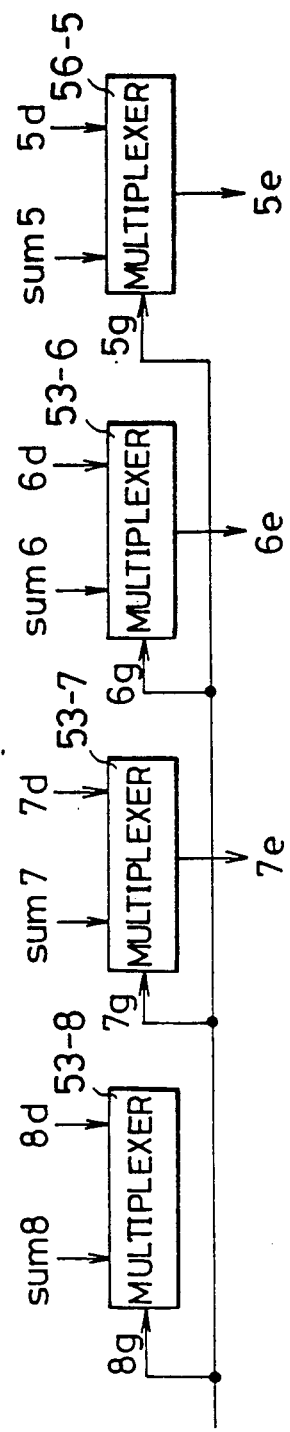
Figure 28:
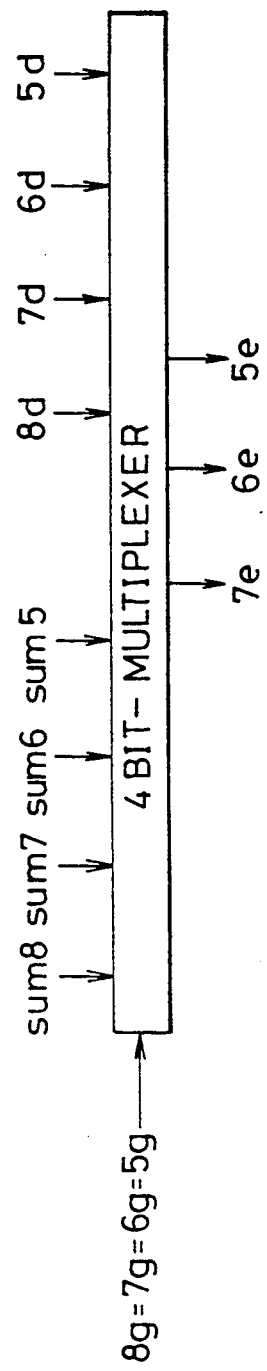
Figure 29:
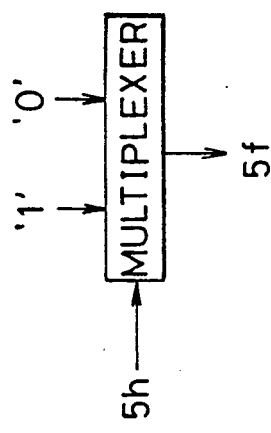

FIG. is a partially enlarged diagram of a framed part Y in FIG. 1;

FIG. 4 is a partially enlarged diagram of a framed part Z in FIG. 1;

FIG. 5 is a block diagram of an arithmetic element as shown in FIG. 1;

FIG. 6 is a block diagram to show a structure of the arithmetic element as shown in FIG. 5;

FIG. 7 is a block diagram of another arithmetic element as shown in FIG. 1;

FIG. 8 is a block diagram to show a structure of the arithmetic element as shown in FIG. 7;

FIG. 9 is a block diagram to show a full adder in the arithmetic element 1;

FIG. 10 is a block diagram to illustrate an operation of the full adder as shown in FIG. 9;

FIG. 11 is a block diagram to show a multiplexer in the arithmetic element 1;

FIG. 12 is a block diagram to illustrate an operation of the multiplexer as shown in FIG. 11;

FIG. 13 is a block diagram of the other multiplexer in the arithmetic element 1;

FIG. 14 is a block diagram to show a structure of incrementers in the arithmetic elements 3 and 4;

FIG. 15 is a block diagram to illustrate an operation of the incrementers as shown in FIG. 14;

FIG. 16 is a block diagram to show full adders in the arithmetic elements 2~4;

FIG. 17 is a block diagram to illustrate an operation of the full adders as shown in FIG. 16;

FIG. 18 is another block diagram to illustrate the operation of the full adders as shown in FIG. 16;

FIG. 19 is a block diagram to show a structure of multiplexers in the arithmetic elements 2~4;

FIG. 20 is a block diagram to illustrate an operation of the multiplexers as shown in FIG. 19;

FIG. 21 is a block diagram to show a structure of another multiplexer in the arithmetic element 2;

FIG. 22 is a block diagram to show a structure of increments in the arithmetic elements 6~8;

FIG. 23 is a block diagram to illustrate an operation of the incrementers as shown in FIG. 22;

FIG. 24 is a block diagram to show a structure of full adders in the arithmetic elements 5~8;

FIG. 25 is a block diagram to illustrate an operation of the full adders as shown in FIG. 24;

FIG. 26 is another block diagram to illustrate the operation of the full adders as shown in FIG. 24;

FIG. 27 is a block diagram to show a structure of multiplexers in the arithmetic elements 5~8;

FIG. 28 is a block diagram to illustrate an operation of the multiplexers as shown in FIG. 27;

FIG. 29 is a block diagram to show a structure of the other multiplexer in the arithmetic element 5.

DESCRIPTION OF THE PREFERRED EMBODIMENT

Figure 2:
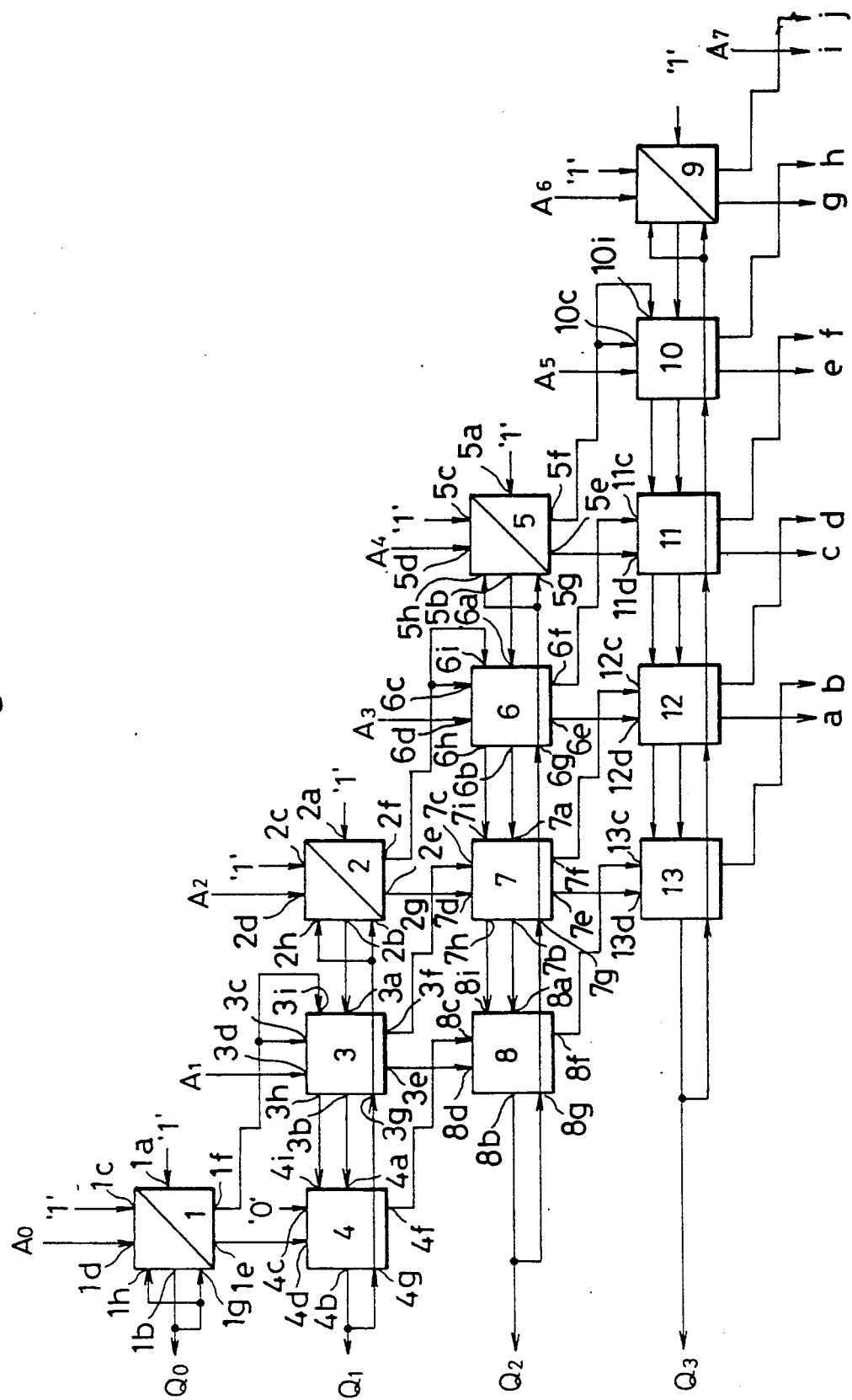
FIG. 2 is a partially enlarged diagram of a framed part X in FIG. 1.
Figure 3:
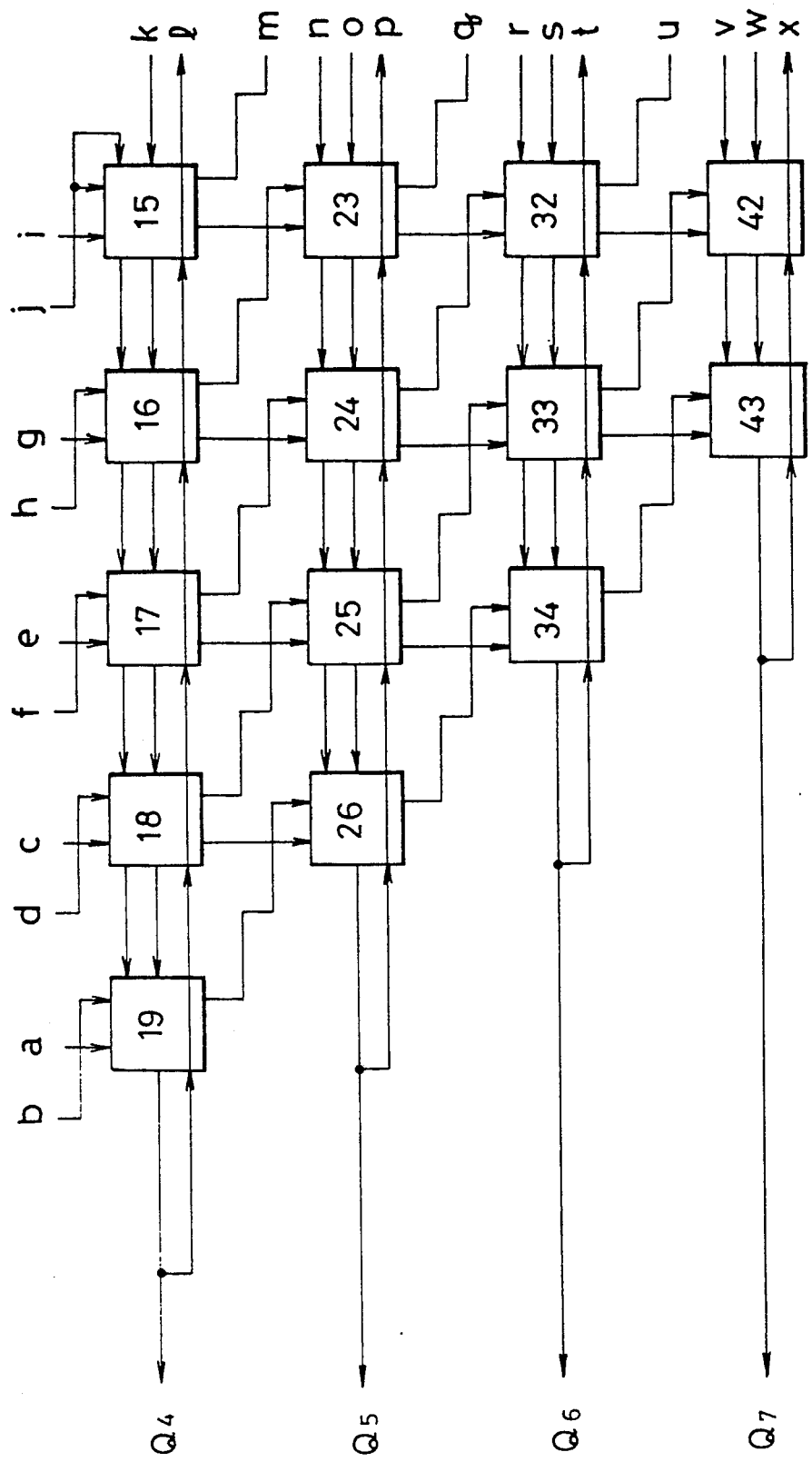

FIG. 1 shows a preferred embodiment of an extractor of a square root according to the present invention, in which a number to be extracted is of 8 bits of A0 to A7. FIG. 1 shows an entire structure of the square root extractor of the present embodiment. FIG. 2 shows a part of FIG. 1, which is enclosed in a frame X surrounding arithmetic elements 1~13. FIG. 3 shows a part of FIG. 1, which is enclosed in a frame Y surrounding arithmetic elements 15~19, 23~26, 32~34, 42 and 43. FIG. 4 shows a part of FIG. 1, which is enclosed in a frame Y surrounding arithmetic elements 14, 20~22, 27~31, and 35~41. In FIG. 2~4, connections between the arithmetic elements are shown by characters "a" to "x".

Each of the arithmetic elements 3, 4, 6~8, 10~13, 15~19, 21~26, 28~34, and 36~43 has terminals as follows. As shown in FIG. 5, increment carry input data ICI is input into an ICI terminal, data carry input data DCI into a DCI terminal, input data DI corresponding to bit data of the number to be extracted into a DI terminal, increment input data II into an II terminal, and output data selection data SI into an SI terminal. After an extraction operation based on these input data, the arithmetic elements output the following output data. Increment carry output data ICO is output from an ICO terminal, data carry output data DCO from a DCO terminal, increment output data IO from an IO terminal, and output data DO from a DO terminal. Some of the arithmetic elements do not output the increment carry output data ICO and the output data DO.

A structure of the arithmetic elements 3, 4, ..., 43 is shown in FIG. 6 in more detail. As seen in FIG. 6, each of the arithmetic elements 3, 4, ..., 43 comprises an incrementer 50, an inverter 51, a full adder 52, and a multiplexer 53. The incrementer 50 receives the increment input data II and the increment carry input data ICI to effect increment of the increment input data II by the increment carry input data ICI, and then outputs the increment carry output data ICO as carry data and the increment output data IO as operation result data. The full adder 52 receives the increment output data IO inverted by the inverter 51, the input data DI, and the data carry input data DCI to add these supplied data, and outputs the data carry output data DCO and the addition result Sum. The multiplexer 53 receives the above addition result and the input data DI, selects either of them based on the output data selection data SI to output the data output DO. In detail the multiplexer 53 outputs the input data DI if the supplied output data selection data SI is "0" or the above addition result Sum if the supplied SI is "1".

On the other hand, arithmetic elements 1, 2, 5, 9, 14, 20, 27, 35 have a structure as shown in FIG. 7. Each of them has terminals as follows. Data carry input data DCI is input into a DCI terminal, input data DI corresponding to the number to be extracted into a DI terminal, input data DI' into a DI' terminal, and output data selection data SI and SI' into SI and SI' terminals, respectively. The arithmetic elements carry out the square root extraction operation based on these input data and output the following data. Data carry output data DCO is output from a DCO terminal, increment output data IO from an IO terminal, output data DO from a DO terminal.

A structure of the above-described arithmetic elements 1, 2, ..., 35 is shown in FIG. 8 in more detail. Each of the arithmetic elements 1, 2, ..., 35 comprises an inverter 54, a full adder 55, a multiplexer 56, and a multiplexer 57. The full adder 55 receives the input data DI' inverted by the inverter 54, the input data DI, and the data carry input data DCI to carry out addition of these supplied data, and outputs the data carry output data DCO and the addition result Sum. The multiplexer 56 receives the above addition result Sum and the input data DI, selects either of them based on the supplied output data selection data SI, and outputs the output data DO. In detail, the multiplexer 56 outputs the input data DI if the supplied output data selection data SI is "0" or the above addition result Sum if the supplied SI is "1". The multiplexer 57 selects to output "1" or "0" based on the selection data SI', which is identical to the above output data selection data SI. In detail, the multiplexer 57 outputs "0" as increment output data if the selection data SI' is "0" or "1" if the selection data SI' is "1".

In the arithmetic elements 1, 2, ..., 35, the input data DI' and the data carry input data DCI both are fixed to "1".

There will be described a constitution of the square root extractor of the preferred embodiment with reference to FIGS. 1~4. Supposing the number to be extracted and a square root thereof both are of 8 bits, the bit data of the square root is provided as Q0 to Q7. The bit data Q0 is given by the arithmetic element 1, and the bit data Q1~Q7 by the other arithmetic elements. As seen in FIG. 1, the bit data Q0 is obtained from the arithmetic element 1 arranged in the first row, the bit data Q1 from the arithmetic element 2~4 arranged in the second row, the bit data Q2 from the arithmetic elements 5~8 arranged in the third row, and Q3~Q7 from the elements in each of 4th to 8th rows similarly as shown. The square root extractor of the present embodiment has a plurality of rows of arithmetic elements. The constitution of the square root extractor will be more detailed below.

In FIG. 2, the arithmetic element 1 arranged in the first row receives "1" as data carry input data DCI at a DCI terminal 1a, the most significant bit data A0 of the number to be extracted as input data DI at a DI terminal 1d, "1" as input data DI at the DI terminal 1d, and "1" as input data DI' at a DI' terminal 1c. A DCO terminal 1b outputting the data carry output data DCO is connected to an output terminal of the most significant bit data Q0 of the square root, as well as to an SI terminal 1g and to an SI' terminal 1h. Thus the data carry output data DCO is supplied to the arithmetic element 1 as output data selection data SI, SI' A DO terminal 1e outputting the output data DO is connected to a DI terminal 4d of the arithmetic element 4 arranged in the second row, and an IO terminal if outputting the increment output data IO is connected to an II terminal 3c and to an ICI terminal 3i of the arithmetic element 3 arranged in the second row.

In the second row, the arithmetic element 2 receives "1" at a DCI terminal 2a as in the element 1, bit data A2 of the number A to be extracted at a DI terminal 2d, and "1" at a DI' terminal 2c. A DCO terminal 2b is connected to a DCI terminal 3a of the arithmetic element 3, a DO terminal 2e to a DI terminal 7d of the arithmetic element 7 arranged in the third row providing the bit data Q2 of the square root, and an IO terminal 2f to an II terminal 6c and to an ICI terminal 6i of the arithmetic element 6 arranged in the third row.

In the arithmetic element 3, the bit data A1 of the number A to be extracted is supplied to a DI terminal 3d. An ICO terminal 3h is connected to an ICI terminal 4i of the arithmetic element 4, a DCO terminal 3b to a DCI terminal 4a of the arithmetic element 4, a DO terminal 3e to a DI terminal 8d of the arithmetic element 8 arranged in the third row, and an IO terminal 3f to an II terminal 7c of the arithmetic element 7.

In the arithmetic element 4, data "0" is supplied to an II terminal 4c. A DCO terminal 4b is connected to an output terminal of bit data Q1 of the square root, to SI terminals 2g, 3g, 4g of respective arithmetic elements 2, 3, 4 arranged in the second row, and to an SI' terminal 2h of arithmetic element 2. The data carry output data DCO output from the arithmetic element 4 is supplied to the arithmetic elements 2, 3, 4 as output data selection data SI, SI'. An IO terminal 4f is connected to an II terminal 8c of the arithmetic element 8. In the arithmetic element 4, the ICO and DO terminals are connected to nowhere.

In the third row, the arithmetic element 5 receives "1" at a DCI terminal 5a as in the elements 1 and 2, bit data A4 of the number A to be extracted at a DI terminal 5d, and "1" at a terminal 5c. A DCO terminal 5b is connected to a DCI terminal 6a of the arithmetic element 6, a DO terminal 5e to a DI terminal 11d of the arithmetic element 11 arranged in the fourth row providing the bit data Q3 of the square root, and an IO terminal 5f to an II terminal 10c and to an ICI terminal 10i of the arithmetic element 10 arranged in the fourth row.

In the arithmetic element 6, the bit data A3 of the number A to be extracted is supplied to a DI terminal 6d. An ICO terminal 6h is connected to an ICI terminal 7i of the arithmetic element 7, a DCO terminal 6b to a DCI terminal 7a of the arithmetic element 7, a DO terminal 6e to a DI terminal 12d of the arithmetic element 12 arranged in the fourth row, and an IO terminal 6f to an II terminal 11c of the arithmetic element 11.

In the arithmetic element 7, an ICO terminal 7h is connected to an ICI terminal 8i of the arithmetic element 8, a DCO terminal 7b to a DCI terminal 8a of the arithmetic element 8, a DO terminal to a DI terminal 13d of the arithmetic element arranged in the fourth row, and an IO terminal 7f to an II terminal 12c of the arithmetic element 12.

In the arithmetic element 8, a DCO terminal 8b is connected to an output terminal of the bit data Q2 of the square root, to SI terminals 5g~8g of respective arithmetic elements 5~8 arranged in the third row, and to an SI' terminal 5h of the arithmetic element 5. The data carry output data DCO output from the arithmetic element 8 is also supplied as output data selection data SI, SI' to the arithmetic elements 5~8. An IO terminal 8f is connected to an II terminal 13c of the arithmetic element 13. The ICO and DO terminals of the arithmetic element 8 are connected to nowhere.

The arrangement of the arithmetic elements in the fourth to the eighth rows is similar to the above-described manner, so that explanation is omitted to avoid redundancy. In the fifth to eighth rows, a DI terminal of the arithmetic element 15 arranged in the fifth row receives the bit data A7, but DI terminals of the other arithmetic elements 14, 20, 21, 27, 28, 35, 36 receive "0".

The square root extractor of the present invention is constituted as described above. The operation of the extractor will be explained below. The extraction operation of the extractor according to the present invention is a sort of subtraction shift method, in which a square root of a number to be extracted is gained in the order starting from the most significant column to the lower.

To explain the operation of the square root extractor, a number A to be extracted is set, for example, as a number of 8 bits (A0,A1,A2,A3,A4,A5,A6,A7)=1.1010101. The operation will be explained with reference to the accompanying drawings and the following table, using the same numbers and characters for the same elements.

TABLE

| Row | Incrementer | Full adder | Multiplexer | √ |
|---|---|---|---|---|
| 1st |  | 1 ← A0<br>−) 1<br>ʘ0 | DCO = 1 Multiplexer<br>56  0<br>Multiplexer<br>57  1 | 1 |
| 2nd | 01<br>+) 1<br>10 | ┌── A1<br>↓<br>010 ← A2<br>−) 101<br>ʘ01 | DCO = 0 Multiplexer<br>56  10<br>Multiplexer<br>57  0 | 0 |
| 3rd | 100<br>+) 0<br>100 | ┌── A3<br>↓<br>1010 ← A4<br>−) 1001<br>ʘ001 | DCO = 1 Multiplexer<br>56  001<br>Multiplexer<br>57  1 | 1 |
| 4th | 1001<br>+) 1<br>1010 | ┌── A5<br>↓<br>00110 ← A6<br>−) 10101<br>ʘ0001 | DCO = 0 Multiplexer<br>56  0110<br>Multiplexer<br>57  0 | 0 |

TABLE-continued

| Row | Incrementer | Full adder | Multiplexer | V |
|---|---|---|---|---|
| 5th | 10100<br>+) 0<br>―――――<br>10100 | ┌―A7<br>↓<br>011010<br>―) 101001<br>―――――<br>(1)10001 | DCO = 0 | Multiplexer<br>56  11010<br>Multiplexer<br>57     0 | 0 |
| 6th | 101000<br>+) 0<br>―――――<br>101000 | 1101000<br>―) 1010001<br>―――――<br>(0)010111 | DCO = 1 | Multiplexer<br>56  010111<br>Multiplexer<br>57     1 | 1 |
| 7th | 1010001<br>+) 1<br>―――――<br>1010010 | 01011100<br>―) 10100101<br>―――――<br>(0)0110111 | DCO = 0 | Multiplexer<br>56  1011100<br>Multiplexer<br>57     0 | 0 |
| 8th | 10100100<br>+) 0<br>―――――<br>10100100 | 101110000<br>―) 101001001<br>―――――<br>(0)00100111 | DCO = 1 | | 1 |

In the arithmetic element 1 of the first row, the full adder 55 receives "1" of the most significant bit data A0 of the number to be extracted through the DI terminal 1d as shown in FIG. 9. The DCI terminal is receives "1". The data "1" supplied to the DI' terminal 1c is inverted by the inverter 54. The full adder 55 serves as a 1-bit subtractor as a result as shown in FIG. 10, so that it carries out the subtraction of the DI' terminal input data from the DI terminal input data. The subtraction result Sum1 is "0" of binary digit (data will be of binary digit hereinafter unless otherwise noted), which is shown in the first row of the table. The data Sum1 is output to the multiplexer 56 as shown in FIGS. 8 and 11.

The full adder 55 outputs data "1" from the DCO terminal 1b if the subtraction of the input data can be executed or data "0" therefrom if the subtraction cannot be executed. Here, data "1" is output from the DCO terminal as the data carry output data. This data carry output data DCO is the most significant bit data Q0 of the square root, which is shown in the first row of column "square root". In addition, the data carry output data DCO is supplied to the multiplexers 56 and 57 as output data selection data SI and SI'.

There is only one arithmetic element 1 arranged in the first row, so that the data representing whether the subtraction is executed or not is output through the DCO terminal of the arithmetic element 1. Since there are a plurality of arithmetic elements in each of the second to the eighth rows, the data of whether the subtraction is executed or not is provided by the last arithmetic element in each row, which also outputs the bit data of the square root. The data encircled by a dot line in the column "full adder" of the table represents the data of whether the subtraction is executed or not.

The multiplexer 56 receives Sum1 output from the full adder 55, that is "0", and the data supplied to the DI terminal 1d, that is "1" as shown in FIG. 11. Thus the multiplexer 56 serves as a 1-bit multiplexer as shown in FIG. 12. The multiplexer 56 outputs data "0" of the subtraction result through the DO terminal 1e to the DI terminal 4d of the arithmetic element 4 in the second row because the selection data SI is "1".

The multiplexer 57 selects data "1" out of the supplied data because the selection data SI' input through the SI' input terminal 1h is "1" as seen in FIG. 13. The selected data is supplied through the IO terminal 1f to the II terminal and the ICI terminal of the arithmetic element 3 arranged in the second row.

There are the arithmetic elements 2~4 arranged in the second row. An operation of the incrementers 50 in the arithmetic elements 3 and 4 will first be explained. The data "1" is supplied through the II terminal 3c to the incrementer 50-3 of the arithmetic element 3 from the IO terminal 1f of the arithmetic element 1 as shown in FIG. 14, and the data "0" through the II terminal 4c to the incrementer 50-4 of the element 4. The data "1" is supplied from the IO terminal 1f of the element 1 through the ICI terminal 3i of the arithmetic element 3. Accordingly, the incrementers 50-3 and 50-4 serve as a 2-bit incrementer processing 2-bit data as shown in FIG. 15. The 2-bit incrementer carries out an arithmetic operation of $(4c,3c)+3i$ by the terminal numbers or $(01)+1$ by the bit data as shown in the column "incrementer" in the second row of the table. The data output from these incrementers 50-3, 50-4 is supplied to the lower full adders 52.

In the full adders of the arithmetic elements 2~4, the full adder 55-2 of the arithmetic element 2 as shown in FIG. 16 receives data "1" through the DI' terminal 2c and the inverter 54-2, the bit data A2 of the number to be extracted through the DI terminal 2d, and data "1" through the DCI terminal 2a. The full adders 52-3, 52-4 of the arithmetic elements 3, 4 receive the bit data A1 of the number to be extracted through the DI terminal 3d, the data "1" and "0", which is output from the above-mentioned incrementers 50-4, 50-3, through the inverters 51-4, 51-3, respectively, and the data "0", which is output from the DO terminal 1e of the arithmetic element 1, through the terminal 4d. The carry data is input and output between the full adders 55-2, 52-3, 52-4. Therefore, the full adders 55-2, 52-3, 52-4 can be considered as a 3-bit adder processing 3-bit data as shown in FIG. 17. Further, if the inverters 51-3, 51-4, 54-2 are included, they may be considered as a 3-bit subtractor processing 3-bit data as shown in FIG. 18. The full adders 55-2, 52-3, 52-4 carry out an arithmetic operation of $(4d, 3d, 2d)-(4f, 3f, 2c)$ by the terminal numbers or $(010)-(101)$ by the bit data as shown in the column "full adder" in the second row of the table.

In this operation, the subtraction cannot be executed, so that data "0" is output from the DCO terminal 4b of the arithmetic element 4, in which the full adder 52-4 is incorporated. This data "0" becomes the bit data Q1 of the square root as shown in the column "square root" in the second row of the table. Also, the data carry output data DCO is supplied to the multiplexers 53, 56, 57 of the arithmetic elements 2~4 as output data selection data SI, SI'.

As shown in FIG. 19, the multiplexer 56-2 in the arithmetic element 2 receives Sum2, which is the output data of the full adder 55-2, and the bit data A2 of the number to be extracted through the DI terminal 2d. The multiplexer 53-3 of the arithmetic element 3 receives Sum3, which is the output data of the full adder 52-3, and the bit data A1 of the number to be extracted through the DI terminal 3d. The multiplexer 53-4 of the arithmetic element 4 receives Sum4, which is the output data of the full adder 52-4, and the data Sum1 from the DO terminal 1e of the arithmetic element 1.

The SI terminals 2g, 3g, 4g of the multiplexers 56-2, 53-3, 53-4 receive data "0". Accordingly the multiplexers 56-2, 53-3, 53-4 may be considered as a 3-bit multiplexer processing 3-bit data as shown in FIG. 20. The 3-bit multiplexer selects either the data (Sum4, Sum3, Sum2) or the data (Sum1,1,0) supplied to the terminals 4d, 3d, 2d based on the output data selection data. As explained, the output data selection data is "0", so that the 3-bit multiplexer selects the data (Sum1,1,0). Since the arithmetic element 4 does not have a DO terminal, the data Sum1 out of the selected data is not output therefrom. Thus, the data output from the multiplexers is "1" and "0" as shown in the column "multiplexer" in the second row of the table. In detail the DO terminal 2e of the arithmetic element 2 outputs data "0" and the DO terminal 3e of the arithmetic elements outputs data "1".

The multiplexer 57-2 of the arithmetic element 2 receives data "0" as the output data selection data through the terminal 2h as shown in FIG. 21. Thus the data "0" is output through the IO terminal 2f of the arithmetic element 2 as shown in the column "multiplexer" in the second row of the table.

There are the arithmetic elements 5~8 arranged in the third row. An operation of the incrementers 50 in the arithmetic elements 5~8 will be below explained. As shown in FIG. 22, the incrementer 50-6 of the arithmetic element 6 receives data "0" through the II terminal 6c from the IO terminal 2f of the arithmetic element 2, the incrementer 50-7 of the arithmetic element 7 receives data "0" through the II terminal 7c from the IO terminal 3f of the arithmetic element 3, and the incrementer 50-8 of the arithmetic element 8 receives data "1" through the II terminal 8c from the IO terminal 4f of the arithmetic element 4. Also data "0" is supplied through the ICI terminal 6i of the arithmetic element 6 from the IO terminal 2f of the arithmetic element 2. Accordingly, the incrementers 50-6, 50-7, 50-8 serve as a 3-bit incrementer processing 3-bit data as shown in FIG. 23. The 3-bit incrementer carries out an arithmetic operation of (8c,7c,6c)+6i by the terminal numbers or (100)+0 by the bit data, as shown in the column "incrementer" in the third row of the table. The data from the incrementers 50-6, 50-7, 50-8 is supplied to the full adder 52 as described below.

In the full adders in the arithmetic elements 5~8, as shown in FIG. 24, the full adder 55-5 of the arithmetic element 5 receives data "1" through the DI' terminal 5c and the inverter 54-5, the bit data A4 of the number to be extracted through the DI terminal 5d, and data "1" through the DCI terminal 5a. The full adders 52-6, 52-7, 52-8 of the arithmetic elements 6~8 receive the bit data A3 of the number to be extracted through the DI terminal 6d, the data "1", "0", "0", which are the output data of the incrementers 50-8, 50-7, 50-6, through the inverters 51-8, 51-7, 51-6, data "0", which is output from the DO terminal 2e of the arithmetic element 2, through the terminal 7d, and data "1", which is output from the DO terminal 3e of the arithmetic element 3, through the terminal 8d. The carry data is output and input between the full adders 55-5, 52-6, 52-7, 52-8. Accordingly, the full adders 55-5, 52-6, 52-7, 52-8 may be considered as a 4-bit adder processing 4-bit data as shown in FIG. 25. Furthermore, if the inverters 51-6, 51-7, 51-8, 54-5 are incorporated, they may be considered as a 4-bit subtractor processing 4-bit data as shown in FIG. 26. The full adders 55-5, 52-6, 52-7, 52-8 carry out an arithmetic operation of $(8d,7d,6d,5d)-(8f,7f,6f,5c)$ by the terminal numbers or (1010)−(1001) by the bit data as shown in the column "full adder" in the third row of the table.

The subtraction can be executed in this operation, so that data "1" is output from the DCO terminal 8b of the arithmetic element 8, in which the full adder 52-8 is incorporated. This data "1" becomes the bit data Q2 of the square root as shown in the column "square root" in the third row of the table. In addition, the data carry output data DCO is supplied to the multiplexers 53, 56, 57 of the arithmetic elements 5~8 as output data selection data SI, SI'.

As shown in FIG. 27, the multiplexer 56-5 of the arithmetic element 5 receives Sum5, which is output from the full adder 55-5, and the bit data A4 of the number to be extracted through the DI terminal 5d. The multiplexer 53-6 of the arithmetic element 6 receives Sum6, which is output from the full adder 52-6, and the bit data A3 of the number to be extracted through the DI terminal 6d. The multiplexer 53-7 of the arithmetic element 7 receives data Sum7, which is output from the full adder 52-7, and data Sum2 from the DO terminal 2e of the arithmetic element 2. The multiplexer 53-8 of the arithmetic element 8 receives Sum8, which is output from the full adder 52-8, and the data Sum3 from the DO terminal of the arithmetic element 3.

The SI terminals 5g~8g of the multiplexers 56-5, 53-6, 53-7, 53-8 receive data "1" as output data selection data. Therefore, the multiplexers 56-5, 53-6, 53-7, 53-8 may be considered as a 4-bit multiplexer processing 4-bit data as shown in FIG. 28. The 4-bit multiplexer selects either data (Sum8,Sum7,Sum6,Sum5) or data (Sum3,Sum2,1,0) supplied to the terminals 8d, 7d, 6d, 5d, based on the output selection data. Since the output data selection data is "1" in this case as explained, the multiplexers select the data (Sum8,Sum7,Sum6, Sum5). Since the arithmetic element 8 has no DO terminal, the data Sum8 is not output therefrom. Thus, the output data from the multiplexers is 001 as shown in the column "multiplexer" in the third row of the table. In detail, the DO terminal 5e of the arithmetic element 5 outputs data "1", the DO terminal 6e of the arithmetic element 6 "0", and the DO terminal 7e of the arithmetic element 7 "0".

The multiplexer 57-5 of the arithmetic element 5 receives the data "1" as output data selection data at the terminal 5h as shown in FIG. 29, so that the data "1" is output from the IO terminal 5f of the arithmetic element 5 as shown in the column "multiplexer" in the third row of the table.

Similar arithmetic operations are carried out in the remaining arithmetic elements in the following rows up to the eighth row in sequence of rows.

When a number to be extracted is 0.1101010, then the mumber A is set as (A0, A1, A2, A3, A4, A5, A6, A7)=0.1101010. The number Q is obtained by the same method explained above as (Q0, Q1, Q2, Q3, Q4, Q5, Q6, Q7)=0.1110100 obtaining the final result. When a number to be extracted is 110.10101, then the number A is set as (A0, A1, A2, A3, A4, A5, A6, A7)=1.1010101 after shifting the binary point 2 spaces to the left. The shifting operation may be performed by a shift register (not shown). The number Q is obtained by the same method explained above as (Q0, Q1, Q2, Q3, Q4, Q5, Q6, Q7)=1.0100101 . The final result is obtained as 10.100101 after shifting the binary point of the number Q to the right 1 space that is a half of the above spaces. The shifting operation may be performed by another shift register (not shown). When a number to be extracted is 11.010101, then the number A is set as (A0, A1, A2, A3, A4, A5, A6, A7)=0.1101010 after shifting the binary point 2 spaces to the left. The number Q is obtained as (Q0, Q1, Q2, Q3, Q4, Q5, Q6, Q7)=0.1110100. The final result is obtained as 1.110100 after shiting the binary point of the number Q to the right 1 space that is a half of the above spaces. It should be understood that any other number may be extracted by quite the same method explained above.

In case of the above-described embodiment of the square root extractor according to the present invention, the extraction operation is carried out starting from the first row up to the eighth row in its sequence. In the conventional extractors, as explained above, the arithmetic operation is carried out for each bit of the number to be extracted in sequence and the calculation time for each bit is determined by assigning the longest probable time for every bit to control the operation of the constituting parts. For example, if the number is of 8 bits and the operation time is set to 20 nano seconds for each bit for the operation control, the total time for the calculation for all bits is 160 (20×8) nano seconds. On the other hand, the square root extractor of the preferred embodiment according to the present invention has no parts requiring the operation control such as registers and shifters, so that it does not always have to set such a fixed calculation time of the longest probability for every bit. Unless one sets the calculation time to 20 nano seconds for every bit of 8 bits, faster calculation may be achieved by the square root extractor of the present invention. If one sets such a calculation time as 2 nsec. (nano seconds) for the 1st column, 4 nsec. for the 2nd, 6 nsec. for the 3rd, 10 nsec. for the 4th, 12 nsec. for the 5th, 15 nsec. for the 6th, 18 nsec. for the 7th, and 20 nsec. for the 8th, the total calculation time will be 87 nsec. Since the calculation time is in general shorter than 20 nsec. for each bit, the square root extractor of the present invention can achieve high speed processing of square root extraction as compared to the conventional extractors.

Further, the square root extractor of the present invention includes neither shifters nor registers, which are used in the conventional extractors, so that extra control circuits are unnecessary for controlling the operations of such shifters and registers in its circuit arrangement. This allows the circuit arrangement of the extractor to be simplified.

Furthermore, the square root extractor of the present invention can readily be arranged for any length of bits by adjusting the number of arithmetic elements in correspondence with the bit length of the number to be extracted.

As explained above, the square root extractor of the present invention does not include any elements necessitating operation control such as shifters and registors in the arithmetic elements. Therefore, a time for the arithmetic operation does not have to be set fixed at the longest probable time for every bit of the number to be extracted, which is the case in the conventional extractors. In the square root extractor of the present invention, the operation time can individually be set for each data to carry out the extraction of the square root, which results in great reduction of processing time of square root extraction as compared with the conventional extractors. Since the arithmetic elements include neither shifters nor registors requiring the operation control, the extractor of the present invention may be constructed in a simpler form.

Many widely different embodiments of the present invention may be constructed without departing from the spirit and scope of the present invention. It should be understood that the present invention is not limited to the specific embodiments described in the specification, except as defined in the appended claims.

What is claimed is:

1. An extractor of a square root of a number represented by bit data having a given bit length comprising:
   first arithmetic element means comprising a plurality of identical first arithmetic elements, each of said plurality of first arithmetic elements having respectively different inputs and outputs and each comprising:
   an adder for carrying out an addition operation based on respective bit data, respective inverted data obtained by inverting binary one, and respective carry input data input thereto, to output addition result data and respective carry output data,
   a first selection circuit for outputting as respective first output data either said addition result data or said respective bit data based on respective selection data, and
   a second selection circuit for selecting either one or zero based on said respective selection data and outputting the selected data as respective second output data; and
   second arithmetic element means comprising a plurality of identical second arithmetic elements, each of said plurality of second arithmetic elements having respectively different inputs and outputs and each comprising:
   an incrementer for receiving respective increment carry input data to effect increment of respective increment input data and outputting respective increment carry output data and respective increment output data,
   an adder for carrying out an addition operation based on inverted increment output data output from said incrementer, respective bit data, and respective carry input data input thereto, to output addition result data and respective carry output data, and
   a selection circuit for selecting one of said addition result data and said respective bit data based on respective selection data and outputting the selected data as respective output data;
   wherein said first and second arithmetic element means are connected in series and in a plurality of rows according to the bit length of the bit data of the number to be extracted and of the square root thereof.

2. A square root extractor according to claim 1, wherein a first of said plurality of rows used to calculate a first of said plurality of bits of the square root is comprised of one of said plurality of first arithmetic elements.

3. A square root extractor according to claim 2, wherein a second of said plurality of rows used to calculate a second of said plurality of bits of the square root is comprised of at least one of said plurality of first arithmetic elements and at least one of said plurality of second arithmetic elements.

4. A square root extractor according to claim 3, wherein said second of said plurality of rows is comprised of two of said plurality of second arithmetic elements in series.

5. A square root extractor according to claim 1, wherein a first arithmetic element is disposed at an end of each row opposite to the output end.

6. A square root extractor according to claim 1, wherein each of said plurality of rows except the first row comprises a plurality of arithmetic elements.

7. An extractor of a square root of a number with a given bit length comprising:

a plurality of identical first arithmetic elements, each having a first input data terminal, a second input data terminal, a first output data terminal and a second output data terminal, a carry input data terminal, a carry output data terminal and a selection data terminal, each of said plurality of first arithmetic elements receiving respective input data at the input data terminals and outputting respective output data at the output data terminals, and each respectively comprising:

an adder used for subtraction based on bit data, inverted data obtained by inverting binary one and carry input data input thereto at the carry input data terminal, to output carry output data to the carry output data terminal and to output addition result data, a first selection circuit receiving said addition result data from said adder and said bit data and outputting either said addition result data or said bit data as first output data at said first output data terminal based on selection data from the selection data terminal, and a second selection circuit for selecting either one or zero based on said selection data from the selection data terminal and outputting the selected data as second output data at said second output data terminal;

a plurality of identical second arithmetic elements, each having a first input data terminal, an increment input data terminal, a first output data terminal, an increment output data terminal, an increment carry input data terminal, a carry input data terminal, an increment carry output data terminal, a carry output data terminal and a selection data terminal, each of said plurality of second arithmetic elements receiving respective input data at the input data terminals and outputting respective output data at the output data terminals, and each respectively comprising:

an incrementer receiving increment carry input data from the increment carry input data terminal to effect increment of increment input data at the increment input data terminal and outputting increment output data at the increment output data terminal and increment carry output data at the increment carry output data terminal, an adder used for subtraction of the increment output data output from the incrementer from the first input data input to the first input data terminal based on carry input data at the carry input data terminal to output addition result data and to output carry output data to the carry output data terminal, and a selection circuit selecting one of said addition result data from said adder and said bit data based on selection data at the selection data terminal and outputting the selected data as first output data at the first output data terminal;

the plurality of first arithmetic elements and the plurality of second arithmetic elements being arranged in a plurality of rows, wherein each of said plurality of rows comprises one of said plurality of first arithmetic elements and at least one of said plurality of second arithmetic elements;

the increment carry input data terminal and the carry input data terminal of each second arithmetic element in a row being respectively connected to the increment carry output data terminal and the carry output data terminal of the second arithmetic element of next lower rank in the row, and the carry input data terminal of the second arithmetic element of the lowest rank in the row being connected to the carry output data terminal of the first arithmetic element in the row;

the first output data terminal and the second output data terminal of the one of said plurality of first arithmetic elements and the first output data terminal and the second output data terminal of the second arithmetic elements in each row being respectively connected to the first input data terminals and the second input data terminals of the second arithmetic elements in another row;

the first input data terminal of the first arithmetic element and the first input data terminal of the second arithmetic element of the lowest rank in each row being supplied with either bit data or a binary number zero; and the increment carry input data terminal of the second arithmetic element of the lowest rank in each row being connected to its own second input data terminal.

8. An extractor of a square root according to claim 7, wherein the second input terminal of each of the plurality of first arithmetic receives a binary number one through an invertor, and the carry input data terminal of each of the plurality of first arithmetic elements receives a binary number one.

9. An extractor of a square root according to claim 8, wherein the carry output data terminal of the second arithmetic element of the highest rank in each row is connected to an output terminal of the square root extractor.

10. An extractor of a square root according to claim 9, wherein the selection data terminals of the one of said plurality of first arithmetic elements and the plurality of second arithmetic elements in a row are connected to the output terminal of the row.

11. An extractor of a square root according to claim 10, wherein the first output data terminal and the increment carry output data terminal of the second arithmetic element of the highest rank in a row are not connected.

12. An extractor of a square root according to claim 11, wherein the first row outputs the most significant bit data of the square root, and the carry output data terminal of the one of said plurality of first arithmetic elements in the first row is connected to the output terminal of the first row.

13. An extractor of a square root according to claim 12, wherein the increment input data terminal of the second arithmetic element of the highest rank in the second row receives a binary number zero.

14. An extractor of a square root comprising:

a plurality of identical first arithmetic elements, each having a first input data terminal, a second input data terminal, a first output data terminal and a second output data terminal, a carry input data terminal, a carry output data terminal and a selection data terminal, each of said plurality of first arithmetic elements receiving respective input data at the input data terminals and outputting respective output data at the output data terminals; and each including an adder, a first selection circuit and a second selection circuit, one of the input terminals and a carry output terminal of the adder being respectively connected to the first input data terminal and the carry output data terminal of the first arithmetic element, two input terminals and an output terminal of the first selection circuit being respectively connected to the first input data terminal of the first arithmetic element, a sum output terminal of the adder and the first output data terminal of the first arithmetic element, and two input terminals and an output terminal of the second selection circuit being respectively supplied binary numbers one and zero and connected to the second output data terminal of the first arithmetic element;

a plurality of identical second arithmetic elements, each having a first input data terminal, a second input data terminal, a first output data terminal, a second output data terminal, an increment carry input data terminal, a carry input data terminal, an increment carry output data terminal, a carry output data terminal and a selection data terminal, each receiving respective input data at the input data terminals and outputting respective output data at the output data terminals, and each including an incrementer, an adder and a selection circuit, an input terminal and an output terminal of the incrementer being respectively connected to the second input data terminal and the second output data terminal of the second arithmetic element, input terminals of the adder being respectively connected to the first input data terminal of the second arithmetic element and the increment output data terminal of the incrementer through an inverter, and input terminals and an output terminal of the selection circuit being respectively connected to the first input data terminal of the second arithmetic element, sum output terminal of the adder and the first output data terminal of the second arithmetic element;

the plurality of first arithmetic elements and the plurality of second arithmetic elements being arranged in n rows, the first row comprising a first arithmetic element, the second row comprising a first arithmetic element and two second arithmetic elements and the n-th row comprising a first arithmetic element and n second arithmetic elements;

the increment carry input data terminal and the carry input data terminal of each second arithmetic element in each row being respectively connected to the increment carry output data terminal and the carry output data terminal of a second arithmetic element of next lower rank in the row, the carry input data terminal of the second arithmetic element of the lowest rank in each row being connected to the carry output data terminal of the first arithmetic element in the row;

the carry output data terminal of the second arithmetic element of the highest rank in each row being connected to an output terminal of the row and the carry output data terminal of the first arithmetic element in the first row being connected to the output terminal of the most significant bit data of the square root;

the first output data terminal and the second output data terminal of the one of said plurality of first arithmetic elements and the first output data terminal and the second output data terminal of the second arithmetic elements in each row being respectively connected to the first input data terminals and the second input data terminals of the second arithmetic elements in another row that outputs less significant bit data of the square root;

each of the first input data terminals of the first arithmetic element and the second arithmetic element of the lowest rank in each row being supplied either bit data or a binary number zero;

the increment carry input data terminal of the second arithmetic element of the lowest rank in each row being connected to its own second input data terminal; and the selection data terminals of the first arithmetic element and the second arithmetic elements in each row being connected to the output terminal of the row.

15. An extractor of a square root according to claim 14, wherein the second input data terminal of the first arithmetic element in a row receives a binary number one through an inverter, and the carry input data terminal of the first arithmetic element in a row receives a binary number one.

16. An extractor of a square root according to claim 15, wherein the first output data terminal and the increment carry output data terminal of the second arithmetic element of the highest rank in a row are not connected.

17. An extractor of a square root according to claim 16, wherein the second input data terminal of the second arithmetic element of the highest rank in the second row receives a binary number zero.

* * * * *